United States Patent [19]

Hoffman

[11] Patent Number: 4,884,638
[45] Date of Patent: Dec. 5, 1989

[54] SOIL CORING DEVICE WITH A CORE EJECTOR MECHANISM

[76] Inventor: Michael R. Hoffman, 339 Bayview Dr. NE., St. Petersburg, Fla. 33704

[21] Appl. No.: 346,916

[22] Filed: May 3, 1989

[51] Int. Cl.⁴ .................. E21B 25/00; A63B 57/00; A01B 45/04
[52] U.S. Cl. ........................... 172/22; 172/25; 172/430; 175/40; 175/313; 175/316; 175/403; 294/50.7
[58] Field of Search ............ 172/22, 25, 430; 175/403, 313, 316, 245, 253, 84; 294/50.7, 50.5

[56] References Cited

U.S. PATENT DOCUMENTS

| | | | |
|---|---|---|---|
| 370,810 | 10/1887 | Newman | 175/313 |
| 992,120 | 5/1911 | Walling | 175/313 X |
| 1,692,436 | 11/1928 | Deane | 172/22 X |
| 2,030,770 | 2/1936 | Smith | 172/22 |
| 3,444,938 | 5/1969 | Ballmann | 172/22 X |
| 3,756,323 | 9/1973 | Mays | 172/22 |
| 3,817,337 | 6/1974 | Panak | 172/22 |
| 4,585,072 | 4/1986 | Martinez | 172/22 |

FOREIGN PATENT DOCUMENTS 2031484  4/1980  United Kingdom ............... 175/313

Primary Examiner—Richard J. Johnson

[57] ABSTRACT

A soil coring device with a core ejector mechanism that has a cylindrical cutting tube with two (2) 180 degree opposed tee slots that serve as a guide for an ejection plate, affixed to a cylindrical cutting tube is a tube with a vertically oriented slot attached perpendicularly thereto is a handle to which is affixed a bubble level. Located on the tube is a threaded locking knob that extends through the slot and communicates with a short presetting locking cylinder. Also located on the tube is a threaded locking hand knob that extends through the slot and communicates with a cylindrical rod to which a tamping plate is permanently attached. In operation, the soil coring device handle is rotated causing the cylindrical cutting tube to enter the soil to the predetermined depth, that has been preset by tightening the threaded locking knob into the short presetting locking cylinder, until ejection plate makes contact with the surface. The cylindrical cutting tube is removed from the hole, is then placed into the existing hole on the green, the threaded locking hand knob is released, both feet are placed on opposite sides of the cylindrical cutting tube and positioned on top of the ejection plate, the handle is pulled upwards ejecting the core into the hole. Then the tamping plate is displaced 2"–3" beyond the end of the cylindrical cutting tube, the core is then tamped with a tamping plate to achieve a level surface.

8 Claims, 2 Drawing Sheets

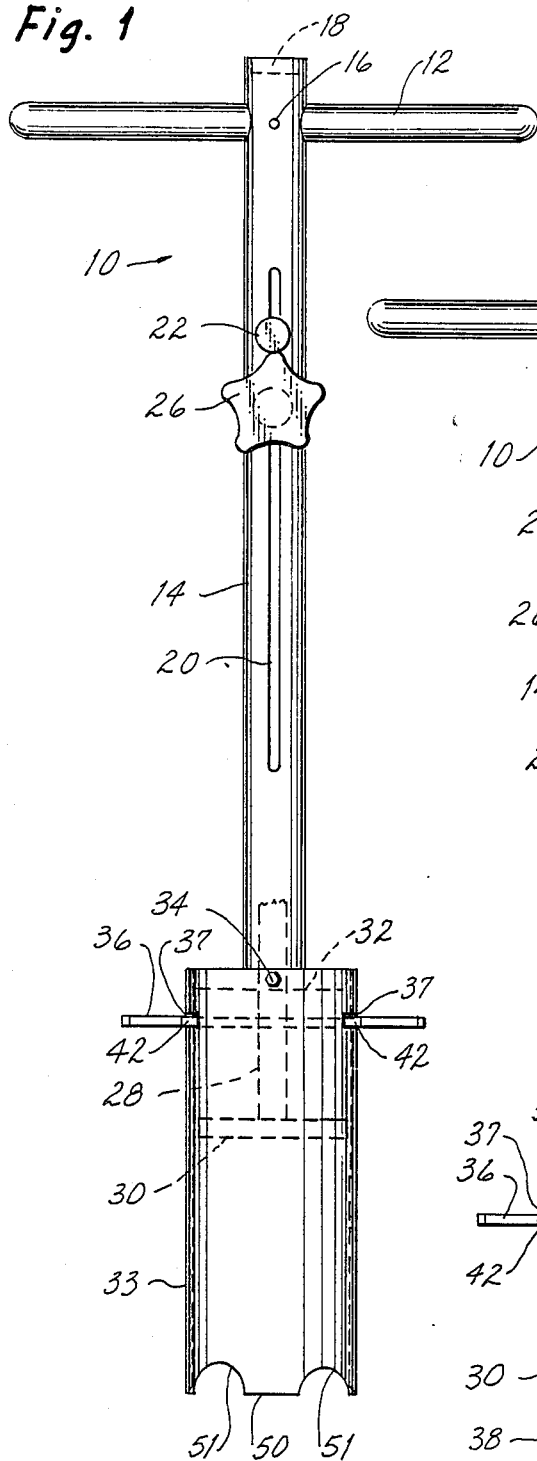
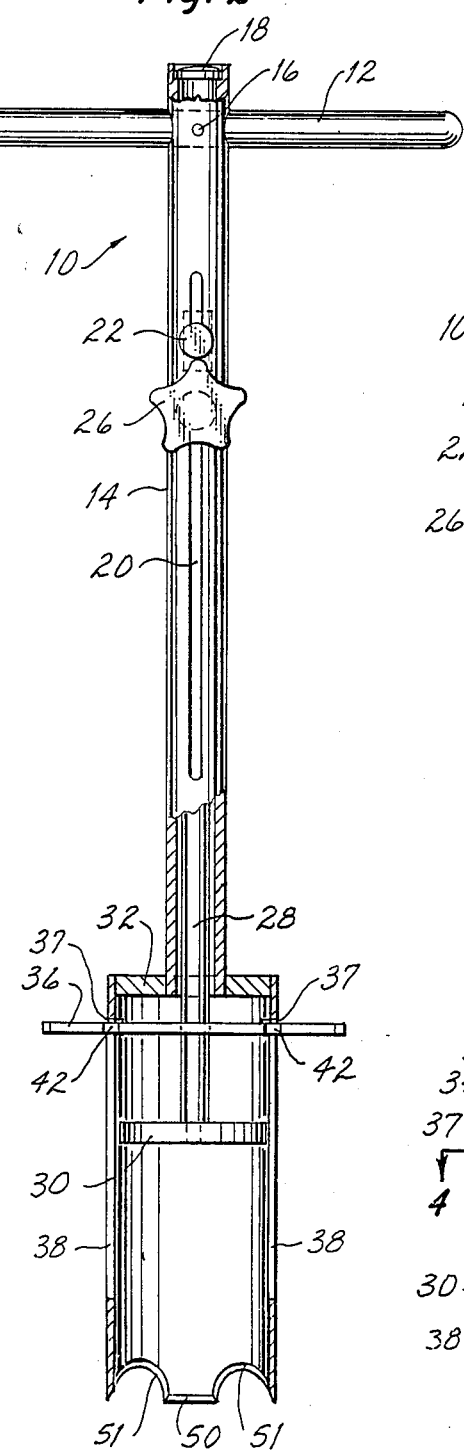
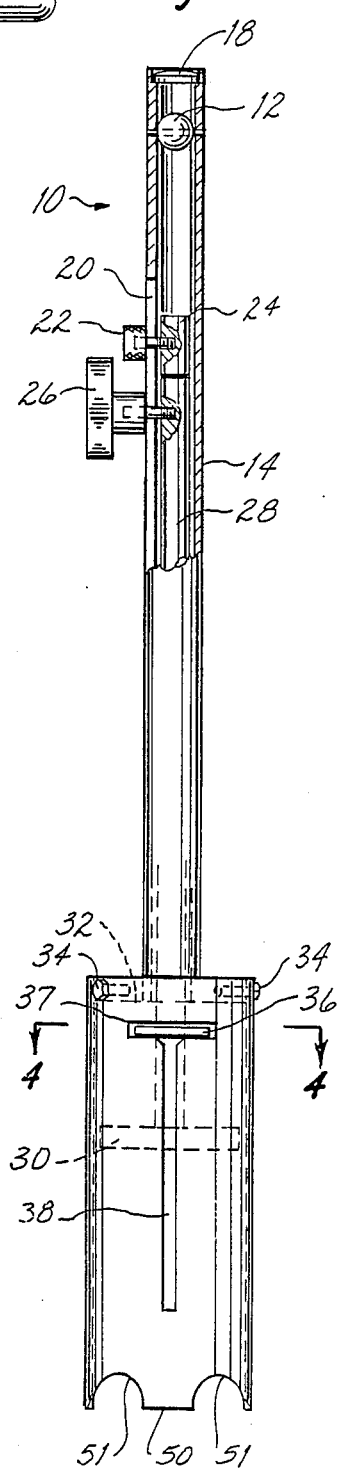

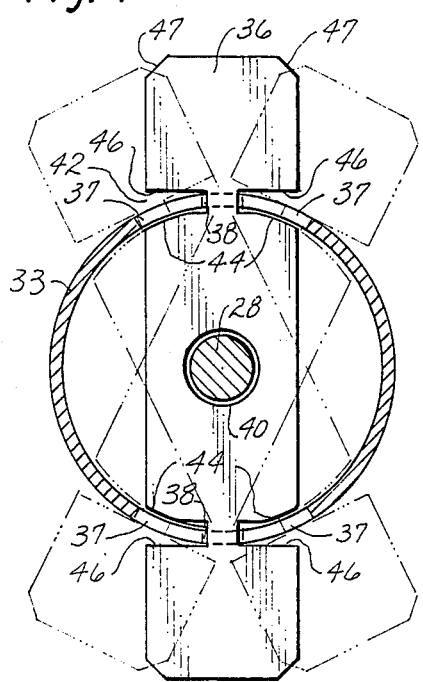
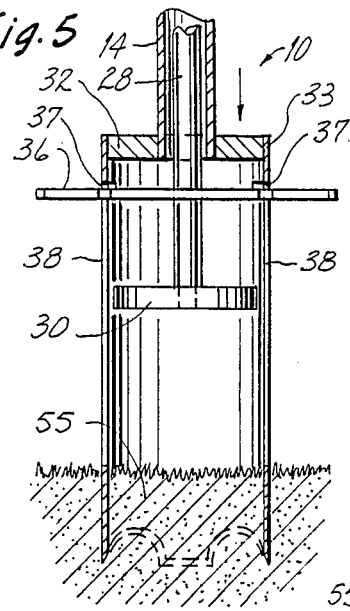
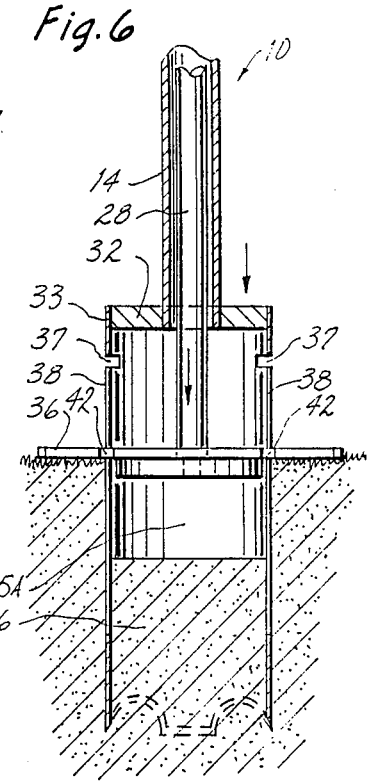
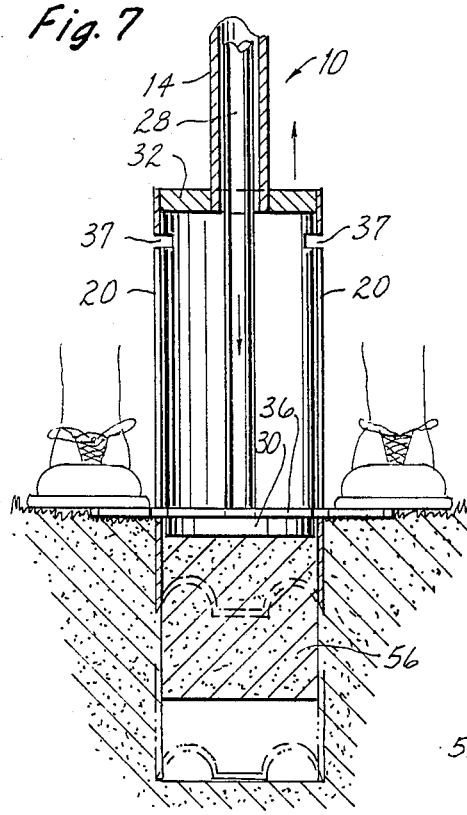
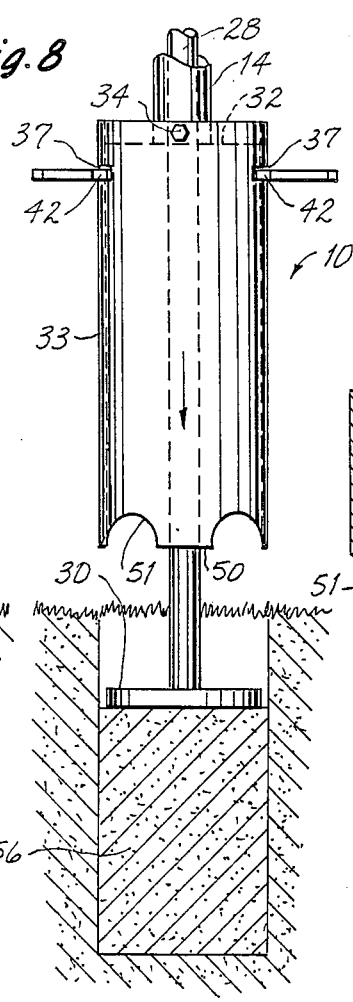
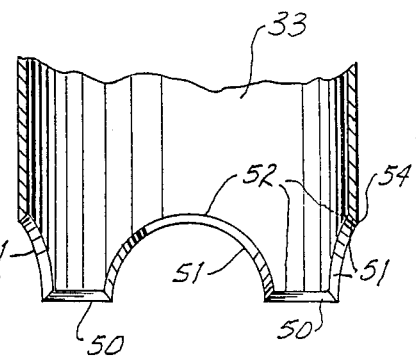

SOIL CORING DEVICE WITH A CORE EJECTOR MECHANISM

BACKGROUND OF THE INVENTION

1. Field of the Invention

The present invention relates to a coring device with a core ejector mechanism for use on golf course greens.

2. Description of Prior Art

Manually operated soil core removal devices for golf course greens are generally adequate for their predetermined function. However, they do not have the capabilities that are required for soil coring devices used on golf course greens to achieve the best results. The depth setting devices used on existing soil coring devices are not adequate; they do not permit the operator to achieve in a consistent manner, the required depth. The reason is that these devices have no means by which the operator can determine that he has reached the depth he wants. Also existing devices have no means for which the operator can determine if the coring device is cutting the hole vertically. Furthermore, existing hole coring devices utilize core removal methods that are difficult to operate. Also, soil compaction cannot be achieved with existing coring devices used on golf courses.

SUMMARY OF THE INVENTION

After considerable research and experimentation a coring device with a core ejector mechanism for use on golf course greens has been devised. The problems noted above are solved by the present invention which provides a soil coring device that is essentially comprised of a handle that is attached perpendicularly to a tube at the top of the tube is attached a bubble level that permits the operator to orient the coring device vertically while he is operating the coring device. The tube has a vertically oriented slot on one side. A threaded locking knob extends through the slot into a short presetting locking cylinder used to set cutting depth. Another threaded locking knob is used for plug ejection and as the tamping plate control. This threaded locking knob extends through the slot and communicates with a cylindrical rod located inside the tube, at the end of the shaft is attached a tamping plate. The tube is affixed to a cylindrical cutting tube that has two (2) 180 degree opposed tee slots, an ejection plate using the tee slots as a guide serves as a core ejector mechanism, while also allowing the operator to determine that he has reached the required cutting depth. A tamping plate permits the operator to push the core out of the cylindrical cutting tube using the threaded hand knob that communicates with a cylindrical rod, and also to compact the ejected core.

BRIEF DESCRIPTION OF THE DRAWINGS

Refer now to the figures in which like numerals depict like parts:

FIG. 1 is one elevational view of the invention.

FIG. 2 is a similar view with portions sectioned to show mechanical aspects.

FIG. 3 is a 90 degree rotated elevational view of the invention with portions sectioned as in FIG. 2.

FIG. 4 is a top sectional view along the lines 4—4 of FIG. 3.

FIG. 5 is a sectional view of the cutting portion of the tamping plate retracted, entering turf for grass plug removal.

FIG. 6 is similar to FIG. 5 showing removal of depth plug.

FIG. 7 is a sectional view of the cutting portion replacing the depth plug into an old hole, indicating two feet standing on the plug removing ejection plate.

FIG. 8 is a sectional view showing the tamping plate extended for tamping in the depth plug.

FIG. 9 is a section of the cylindrical cutting tube showing the four semicircular cutting recesses at 90 degree placement.

DESCRIPTION OF THE PREFERRED EMBODIMENT

Referring to the drawings and more particularly to FIGS. 1, 2 and 3. Numeral 10 with an arrow indicates the overall invention consisting of a handle 12 impaled perpendicularly near the upper part of the invention within a tube 14 secured with a spring pin 16. At the very top of the tube 14 is a self centering bubble level 18 secured therein. At one side of the tube 14 is a clamping slot or slotted hole 20 through which a threaded locking knob 22 communicates with a short presetting locking cylinder 24. Also within the slotted hole 20 is another threaded locking knob 26 which communicates with a cylindrical rod 28 to which a tamping plate 30 is permanently attached. Tube 14 is permanently attached to a plate 32 to which a cylindrical cutting tube 33 is removably attached by means of three cap screws 34. Cylindrical rod 28 passes through an ejection plate 36 which is slidably oriented through the cylindrical cutting tube 33 within a pair of tee or locking slots 38 located 180 degrees opposed in the cylindrical cutting tube 33.

Referring now to FIG. 4, ejection or ejector plate 36 is a piece of flat bar (in this preferred embodiment being approximately $\frac{1}{4}'' \times 2''$), with a central round hole 40 to receive cylindrical rod 28. The ejection plate 36 has four notches 42, the inner surfaces 44 being somewhat rounded to fit within the cutter tube 33, the outer surfaces 46 being straight edged. The extreme outer corners 47 of the ejection plate are chamfered at 45 degrees for safety.

Referring now to FIG. 9, it can be seen that the bottom cutting edges 50 of the cylindrical cutting tube 33 are angled from the inside surface 52 to the outer surface 54, as are the semicircular curved portions 51 of the cutting edges. Thus it can be seen in FIG. 6 that as the cylindrical cutting tube 33 is rotatably forced into the turf the compacted dirt 56 is forcibly wedged into and within the cylindrical cutting tube 33.

As seen in FIGS. 1, 2 and 3, the presetting locking knob 22 sets the required depth of the device when the threaded locking knob 26 allows the cylindrical rod 28 to be brought to bear upon the short presetting locking cylinder 24.

After replacing the compacted dirt plug 56 into the old cup hole as shown in FIG. 7, the operator stands upon the ejection plate 36, loosens threaded locking knob 26, and lifts the handles of the invention. Ejection plate 36 is brought to bear upon the tamping plate 30, thereby pushing the compacted dirt 56 out of the cutting cylinder 33. As shown in FIG. 8, the tamping plate 30 is extended out from the cylindrical cutting tube 33 and the dirt is tamped into the old cup hole. The turf plug 55 (shown in FIG. 5) is then placed over the dirt plug 56 and further tamped into place without damaging turf.

As can be further understood by observing FIG. 3 and more particularly in FIG. 4, by removing threaded locking knob 26 entirely, cylindrical rod 28 with tamping plate 30 may be removed from the device for insertion or removal of ejection plate 36 through the horizontally disposed portion 37 of the tee slot 38. The horizontal portion 37 also allows the plate to be partially rotated in either direction to allow it to rest in the upper position out of the way of the operation when cutting the turf.

Upon locating the exact point at which the new cup hole is to be made, the operator observes the bubble level 18, and when the bubble is centered within the circle in the level, the invention is vertical to the horizon. Maintaining the invention in a vertical plane, he then forcibly rotates the cylindrical cutting tube 33 into the ground approximately 2"-3" into the turf. The plug 55 is then ejected from the cylindrical cutting tube 33 when the threaded locking knob 26 is pushed in a downward direction causing the tamping plate 30 to force the turf plug 55 from the cylindrical cutting tube 33. He then temporarily sets aside the turf plug, reinserts the cylindrical cutting tube 33 into the hole, with the ejection plate 36 laying loosely within tee slots 38 so that it rests upon the upper surface of the tamping plate 30, pulls threaded locking knob 26 upward so that it is brought to bear on the short presetting locking cylinder 24. The threaded locking knob 26 is then tightened against tube 14.

FIG. 6 also discloses a void 55a left by the removal of the turf 55. By allowing the ejection plate 36 to rest on top of the tamping plate 30, which is now locked at the preset depth, the operator knows that the proper depth has been reached when the ejection plate 36 contacts the turf at which point he removes the depth plug 56.

It is to be understood that the form of the invention herewith shown and described is to be taken as a preferred example of the same, and that various changes in the shape, size and arrangement of the parts may be resorted to without departing from the spirit of the invention or scope of the sub joined claims.

I claim:

1. A soil coring device and core ejector mechanism for golf course greens comprising, a cylindrical cutting tube having a lower cutting edge and opposed longitudinally extending guide slots with connecting circumferentially extending locking slots, a foot engageable ejector plate slidably received in said slots and extending laterally beyond each side of the cutting tube, a support tube having a longitudinally oriented clamping slot on one side thereof, said support tube being attached at one end to said cutting tube and having a perpendicularly extending operator handle secured at its opposite end, an elongated slidable rod having one end terminating within said support tube and a second end extending freely through said ejector plate and secured to a circular tamping plate located within said cutting tube below the ejector plate, clamping means associated with said clamping slot for adjustably clamping said rod, and an adjustable stop means associated with said support tube adapted to contact an abutment on said rod to preset the position of the tamping plate with respect to the cutting edge.

2. A soil coring device according to claim 1 wherein the maximum depth of the cylindrical cutting tube is determined by the ejector plate as it makes contact with the surface.

3. A soil coring device according to claim 2 wherein compacted dirt retained in the cylindrical cutting tube may be ejected from said cylindrical cutting tube when the operator of said soil coring device places his feet on said ejection plate and pulls the soil coring device handle upwards, causing said tamping plate to move in a downward direction ejecting the compacted dirt from said cylindrical cutting tube.

4. A soil coring device according to claim 2 wherein the required depth for said device to enter the soil is determined by tightening a threaded locking knob into a short presetting locking cylinder located on said tube.

5. A soil coring device according to claim 3 wherein said clamping means comprises a threaded locking knob and compacted dirt is ejected from said cylindrical cutting tube by loosening said threaded locking knob and pushing said threaded locking knob downwards ejecting said compacted dirt.

6. A soil coring device according to claim 3 wherein said tamping plate may be extended beyond said cylindrical cutting tube, for the purpose of compacting soil that has been ejected from said cylindrical cutting tube.

7. A soil coring device according to claim 1 wherein the cutting end of said cylindrical cutting tube is configured with a series of horizontal edges that are beveled towards the inside of said cylindrical cutting tube, with semicircular cutting recesses that are beveled towards the inside of said cylindrical cutting tube.

8. A soil coring device according to claim 1 wherein a bubble level is located at the upper end of said support tube to indicate to the operator if the coring device is in a vertical position.

* * * * *